J. H. Goodfellow,
Filtering Funnel.

No. 90,523. Patented May 25, 1869.

Witnesses:
J. Thom Goodfellow
Henry S. Church

Inventor:
John H. Goodfellow

United States Patent Office.

JOHN H. GOODFELLOW, OF TROY, NEW YORK.

Letters Patent No. 90,523, dated May 25, 1869.

IMPROVEMENT IN FILTERING-FUNNELS

The Schedule referred to in these Letters Patent and making part of the same.

*To all whom it may concern:*

Be it known that I, JOHN H. GOODFELLOW, of Troy, in the county of Rensselaer, and State of New York, have invented a new and useful Improvement in Filtering-Funnels; and do hereby declare that the following is a clear, full, and exact description of the same, reference being had to the accompanying drawing, making a part of this specification, in which—

Similar letters refer to corresponding parts in both drawings.

Figure 1:
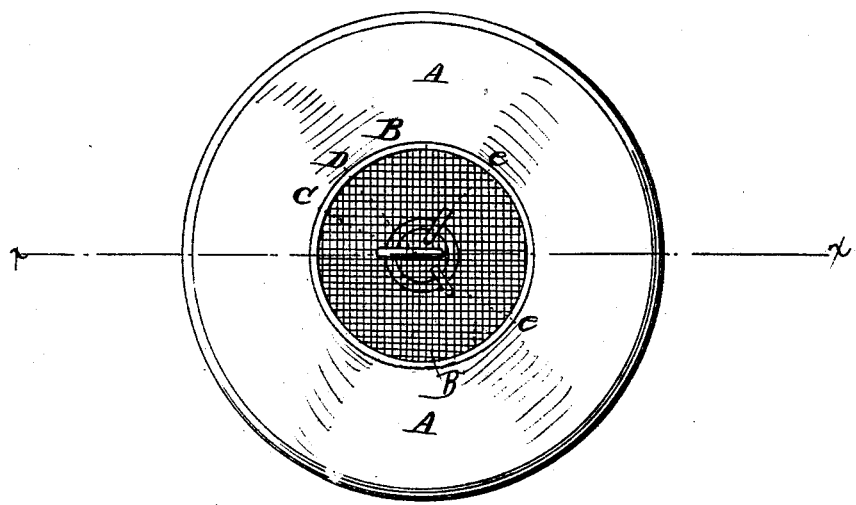
Figure 1 is a face or plan view of my invention.
Figure 2:
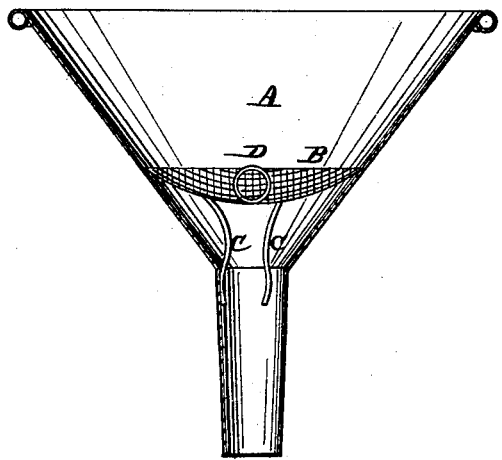
Figure 2 is a central section of the same, taken through the line $x\ x$, fig. 1.

This invention consists of a funnel, having an adjustable screen, or filter, attached by springs, and retained in its proper place, as set forth and described herein.

To enable those skilled in the art to fully understand and construct my invention, I will proceed to describe it.

A is an ordinary funnel, such as is commonly made of tin, glass, or rubber, &c.

B is a circular filter, made of perforated tin plate, wire gauze, or other suitable material, the outer edge, or periphery of which, coincides, or fits closely to the inner sides of the funnel.

C are springs, which are attached, at one end, to the under, or convexed side of the filter, and the other pressing against the upper and inner sides of the neck of the funnel, to keep the filter in its proper place, and from being moved while decanting liquids through it.

D is a small knob, or ring, at the centre of the upper, or concave side of the filter, by which the same is put in its place, or moved.

In chemical uses, non-corrosive material should be applied.

Asbestos springs may be substituted for metal, and platinum, gauze, or perforated glass plate, for the metal disks.

The operation, or manner of using it is as follows:

When this article is to be used for the purpose of decanting fluids from one vessel into another, such as a bottle or jar, with a view to separating the sediment, or dregs, the filter B is inserted in the funnel A, and kept in its position, by the springs C pressing against the sides of the neck of the funnel, by which means the dregs, or solid matter is retained in that portion of the funnel above the filter, at the same time allowing the fluid to pass through its meshes, or perforations, into the vessel beneath.

It is obvious that the springs, or arms may be first attached within the nozzle, and the filtering-plate subsequently attached thereto.

One of the important features of this contrivance is, that when it is desired to use the funnel without the filter, the filter may be removed from its place in the funnel, by the knob, or ring D.

Another important feature is, that the withdrawing of the filter, as above described, permits of the different parts of the instrument being more handily and perfectly cleaned, before or after using.

I am aware that disks for percolation, or to sustain filters, have been supported by legs that expand within the funnel, but in none has the quality of an outward spring in such legs, when passing within the nozzle, been depended on to retain the disk in place, when the funnel is turned to a horizontal position, or totally inverted. Of course, in my apparatus, indentations, a transverse file-like surface, or other like obvious expedients within the nozzle, may be used to promote the efficiency of the apparatus, which expedients, however, will only be necessary to remedy a defective construction, or impediments resulting from injurious uses.

Having thus described my invention,

What I claim as new, and desire to secure by Letters Patent, is—

The filtering-funnel, provided with springs C, substantially as described, and for the purpose set forth.

JOHN H. GOODFELLOW.

Witnesses:
J. THORN GOODFELLOW,
LOUIS D. BEAUREGARD.